Oct. 4, 1955   C. D. BENNES   2,719,805
METHOD AND APPARATUS FOR TRANSFERRING A PICTURE-CARRYING
LAYER FROM ONE FILM TO ANOTHER
Filed June 12, 1952

Inventor
Charles D. Bennes
by Roberts, Cushman & Grover
Att'ys.

United States Patent Office 2,719,805
Patented Oct. 4, 1955

2,719,805

METHOD AND APPARATUS FOR TRANSFERRING A PICTURE-CARRYING LAYER FROM ONE FILM TO ANOTHER

Charles D. Bennes, Los Angeles, Calif., assignor to Technicolor Motion Picture Corporation, Hollywood, Calif., a corporation of Maine Application June 12, 1952, Serial No. 293,144

11 Claims. (Cl. 154—98)

In the art of cinematography it is often desirable to transfer a layer of picture-carrying medium, such as an ordinary gelatin coating, from one film to another. For example, in color photography employing multilayer film for different color aspects, after exposing the different layers to the different color aspects of the scene it is desirable to transfer each picture-carrying layer, except the last, to another film for processing and reproduction. One type of such film comprises three emulsion layers separated by interlayers of colloidal material which is permeable by an aqueous medium so that the layers can be peeled apart by wetting the interlayers. Such a film is disclosed in the patent to Capstaff 2,367,665, granted January 23, 1945.

When using film of the particular kind disclosed in the aforesaid Capstaff patent is it preferable to wet the film in water or other aqueous solution so that the separable emulsion layer is somewhat softened but not yet substantially loosened from the interlayer before the multilayer film is pressed against the blank film. Heretofore this operation has required critical control of the wetting temperature and immersion time because relatively high temperatures were required to render the emulsion tacky and thereby promote adhesion to the new film base. It has also been necessary to employ extended bonding times after the films have been brought together and registered in order to allow sufficient time for the transferable layer to become loosened from the underlying emulsion layer.

In transferring a layer from one film to another by wetting the picture-carrying film with warm water to loosen the outer layer from the next layer and to render the outer layer tacky so that it will adhere to the new film, it has been found that if the wetting temperature is high enough to afford a good bond with the new film the picture-carrying layer becomes so soft that it is damaged in the transfer process. The pre-wetting causes the emulsion to swell so that, when the films are brought into registered contact with register teeth extending through the sprocket holes of the films, the insertion of the registered teeth not only distorts the gelatin surrounding the sprocket holes but it often tears off specks or shreds of emulsion which cling to the films and fall on the picture areas when the films are peeled apart.

Objects of the present invention are to secure a better bond between the picture-carrying layers and the new film, avoid damage to the picture-carrying layers in the transfer process and to reduce the time of the transfer process.

The present invention involves rendering the face of one film sufficiently tacky to cling to the other film lightly, preferably before the two films contact each other, continuously feeding the two films into registered contact, subsequently heating the picture-carrying layer sufficiently to bond it tightly to the new film and then peeling the new film and layer from the old film. While the face of one film may be rendered tacky by the application of heat or adhesive it is preferably done by wetting the picture-carrying layer. While the picture-carrying layer may be mounted on the original film in any suitable way to be peeled off, preferably it is mounted as aforesaid so that it is loosened by the aforesaid pre-wetting; but of course it should not be loosened enough to slip before it is brought into registered contact with the new film. While the films are preferably brought into registered contact by register teeth on a belt, they may be brought into registered contact by register teeth on a sprocket wheel.

The emulsion layers may have any suitable composition and may be prepared in any suitable way. For example, they may be gelatin negative emulsions made as described in any of the following references: Photography by C. B. Meblette, 5th ed., pp. 118 et seq.; Photographic Emulsions by E. J. Wall, 1929, chapters III and IV; Photographic mit Bronsilber—Gelatine und Chlorisilber—Gelatine by Eder, 1903; and Photography with Emulsions by Abney, 1885.

According to the present invention the films are fed along branch paths to a joining location where they are pressed together, and thence along a common path to a separating location where they are peeled apart, and between the two locations the temperature of the picture-carrying layer is raised sufficiently to bond it tightly to the new film. Preferably the films are held in registered contact while traveling from said joining location to an intermediate location, the picture-carrying layer is heated while traveling from the intermediate location to a second intermediate location, and the picture-carrying layer is chilled while traveling from the second intermediate location to the separating location.

For the purpose of illustration a typical embodiment of the invention is shown in the accompanying drawings in which Fig. 1 is a diagram of a machine for transferring a picture-carrying layer from a multilayer film M to a new film base N;

Figure 1:
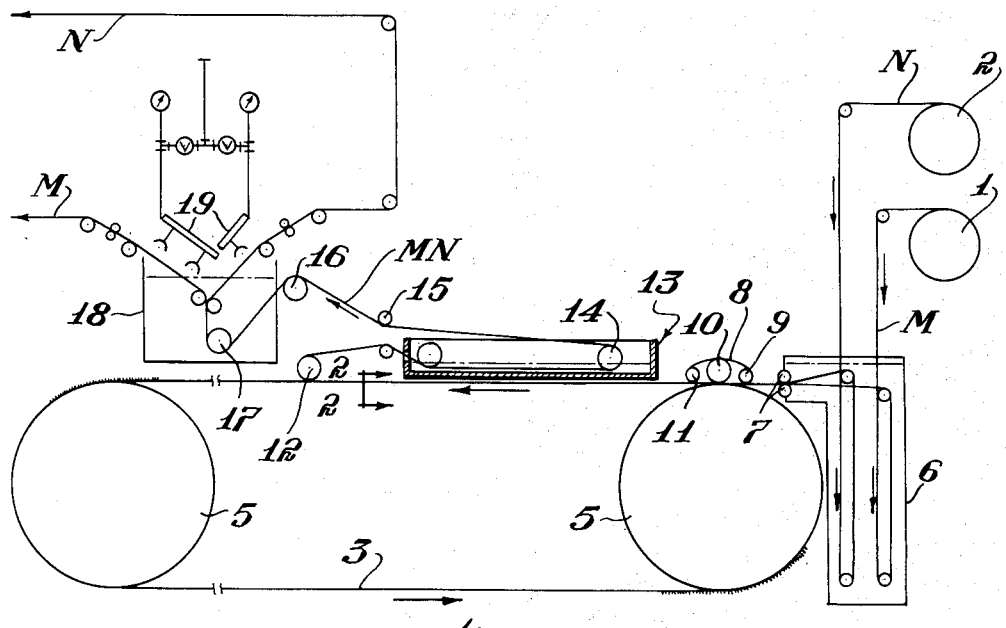
Figure 2:
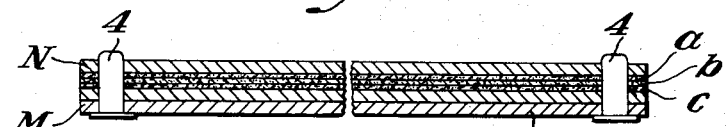
Fig. 2 is a section on line 2—2 of Fig. 1.
Figure 3:
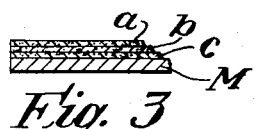
Fig. 3 is a section of a multilayer film having three coatings.
Figure 4:
Fig. 4 is a similar section after one coating has been stripped off.
Figure 5:
Fig. 5 is a similar section after another coating has been stripped off.
Figure 6:
Fig. 6 is a section of a new film base.
Figure 7:
Fig. 7 is a similar section after one of the aforesaid coatings has been transferred to it.
Figure 8:
Fig. 8 is a similar section of another new base after another of said coatings has been transferred to it.

In the particular embodiment of the invention chosen for illustration the multilayer film has three coatings a, b and c, which may comprise three picture-carrying layers representing the blue, green and red aspects of a scene. Either before or after development, the outer coating a is transferred to a new base N and the next coating b is then transferred to another new base N′, leaving only the coating c on the original base M.

The two films are fed from supply reels 1 and 2 to a pin belt 3 having register teeth 4, the belt traveling in the direction indicated by the arrow over drums 5. Before the films reach the pin belt they pass through a tank 6 containing water or other solution, which may be at room temperature, to render the face of the multilayer film slightly tacky or partly loosen the outer picture-carrying layer or both, it being understood that the picture-carrying layer is not loosened sufficiently to permit it to slip before it is brought into registered contact with the new film. As disclosed in my Patent 2,572,001, the two films M and N are pressed into registered contact by a pair of rollers 7 and thence fed along a straight line which is in alignment with a straight portion of the pin belt 3, the film being pressed on the teeth of the pin belt by means of an endless seating belt 8 travelling around rollers 9, 10 and 11. Thence the films travel in contact with each other until the two films adhere together sufficiently to permit them to be fed from the pin belt without slipping one on the other. Usually this takes about 15 seconds to 25 seconds. In the illustration the two films are fed from the pin belt over the roller 12.

After the films leave the pin belt in contact with each other they are fed through an elongate tank 13 containing heating means. When using film of the type disclosed in the aforesaid Capstaff patent, with a gelatin emulsion having a melting point of approximately 120° F., the heating means is preferably warm water at a temperature of approximately 90° F. to 100° F., although any other suitable heating means, such as infra-red rays, may be employed, and the films are in the water only a few seconds. This heat treatment not only bonds the picture-carrying layer to the new film, but it also accelerates the gradual loosening of the picture-carrying layer from the multilayer film. After the picture-carrying layer is firmly attached to the new film, the two films are fed from the tank 13 over the roller 14, under roller 15, over roller 16 and thence under roller 17 in tank 18 containing unheated water which cools the films to or below room temperature and sets the bond between the picture-carrying layer and the film N. The two films are peeled apart in the tank 18 beneath the surface of the water which affords a cleaner separation of the picture-carrying layer from the multilayer film, the outermost layer adhering to the new base instead of the original base. The films M and N are fed to the left and right respectively over a series of rollers and under a series of spray nozzles 19 which remove all of the adhesive which originally held the picture-carrying layer to the multilayer film M. Thence the films feed to suitable take-up reels not shown. After the layer $a$ is transferred to a new film N the next layer $b$ is transferred to another new film N' in similar manner.

It should be understood that the present disclosure is for the purpose of illustration only and that this invention includes all modifications and equivalents which fall within the scope of the appended claims.

This application is a continuation-in-part of Ser. No. 227,248, filed May 19, 1951, now abandoned.

I claim:

1. The method of transferring a layer of picture-carrying medium from one cinematographic film to another which comprises continuously feeding the two films into registered contact and pressing them together while the face of one film is sufficiently tacky to cling to the other film lightly, subsequently raising the temperature of said layer sufficiently to bond it tightly to the new film, and then peeling the new film and layer from the old film.

2. The method of transferring a layer of picture-carrying medium from one cinematographic film to another which comprises continuously feeding the two films into contact and pressing them together while the films are held in registry by register teeth fitting in the sprocket holes of the films and while the face of one film is sufficiently tacky to cling to the other film lightly, carrying the films along a predetermined path on a carrier having register teeth which hold the films in registry until they adhere sufficiently to prevent slippage when the teeth are removed, feeding the films from the carrier, subsequently raising the temperature of said layer sufficiently to bond it tightly to the new film, and then peeling the new film and layer from the old film.

3. The method of transferring a layer of picture-carrying medium from one cinematographic film to another which comprises wetting the face of said layer to render it tacky without substantially heating the layer, continuously feeding the two films into registered contact and pressing them together while the face of the layer is sufficiently tacky to cling to the other film lightly, subsequently raising the temperature of said layer at least to approximately 90° F. to bond it tightly to the new film, and then peeling the new film and layer from the old film.

4. Apparatus for transferring a layer of picture-carrying medium from one cinematographic film to another which comprises means for continuously guiding the films along branch paths into registered contact with each other at a joining location, thence along a common path to a separating location and thence along separate paths, means along one of said branch paths for softening the face of said layer sufficiently to render it tacky, means at said joining location for continuously pressing the two films into registered contact, means between said locations for raising the temperature of said layer sufficiently to bond it tightly to the new film, and means for peeling the new film and layer from the old film at said separating location.

5. Apparatus for transferring a layer of picture-carrying medium from one cinematographic film to another which comprises means for continuously guiding the films along branch paths into registered contact with each other at a joining location, thence along a common path to an intermediate location, thence along a common path to a separating location and thence along separate paths, means along one of said branch paths for softening the face of said layer sufficiently to render it tacky, means at said joining location for continuously pressing the two films into registered contact, means traveling with the films from the joining to the intermediate location for holding the films in registry until they adhere sufficiently to prevent slippage when released, means between the intermediate and separating locations for raising the temperature of said layer sufficiently to bond it tightly to the new film, and means for peeling the new film and layer from the old film at the separating location.

6. Apparatus for transferring a layer of picture-carrying medium from one cinematographic film to another which comprises means for continuously guiding the films along branch paths into registered contact with each other at a joining location, thence along a common path to an intermediate and separating locations, and thence along separate paths, means at said joining location for continuously pressing the two films into registered contact, means traveling with the films from the joining to the intermediate location for holding the films in registry until they adhere sufficiently to prevent slippage when released, means between the joining and intermediate locations for heating said layer sufficiently to bond it tightly to the new film, means between said intermediate and separating locations for cooling said layer, and means for peeling the new film and layer from the old film at the separating location.

7. Apparatus for transferring a layer of picture-carrying medium from one cinematographic film to another which comprises means for continuously guiding the films along branch paths into registered contact with each other at a joining location, thence along a common path to first and second intermediate locations and a separating location, and thence along separate paths, means along one of said branch paths for softening the face of said layer sufficiently to render it tacky, means at said joining location for continuously pressing the two films into registered contact, means traveling with the films from the joining to the first intermediate location for holding the films in registry until they adhere sufficiently to prevent slippage when released, means between the first and second intermediate locations for heating said layer sufficiently to bond it tightly to the new film, means between the second intermediate location and the separating location for cooling said layer, and means for peeling the new film and layer from the old film at the separating location.

8. The method of transferring a layer of picture-carrying medium from one cinematographic film to another which comprises continuously feeding the two films into contact and pressing them together while the films are held in registry by register teeth fitting in the sprocket holes of the films and while the face of one film is sufficiently tacky to cling to the other film lightly, carrying the films along a predetermined path on a carrier having register teeth which hold the films in registry until they adhere sufficiently to prevent slippage when the teeth are removed, feeding the films from the carrier, subsequently heating said layer sufficiently to bond it tightly to the new film, cooling the layer to reharden it, and then peeling the new film and layer from the old film.

9. The method of transferring a layer of picture-carrying medium from one cinematographic film to another which comprises continuously feeding the two films into registered contact and pressing them together while the face of one film is sufficiently tacky to cling to the other film lightly, subsequently raising the temperature of said layer sufficiently to bond it tightly to the new film, cooling the layer to reharden it, and then peeling the new film and layer from the old film.

10. The method of transferring a layer of picture-carrying medium from one cinematographic film to another which comprises continuously feeding the two films into registered contact and pressing them together while the face of one film is sufficiently tacky to cling to the other film lightly, subsequently passing the films through liquid at least approximately 90° F. to bond said layer tightly to the new film, and then peeling the new film and layer from the old film.

11. The method of transferring a layer of picture-carrying medium from one cinematographic film to another which comprises continuously feeding the two films into contact and pressing them together while the films are held in registry by register teeth fitting in the sprocket holes of the films and while the face of one film is sufficiently tacky to cling to the other film lightly, carrying the films along a predetermined path on a carrier having register teeth which hold the films in registry until they adhere sufficiently to prevent slippage when the teeth are removed, feeding the films from the carrier, subsequently passing the films through liquid at least approximately 90° F. to bond said layer tightly to the new film, and then peeling the new film and layer from the old film.

References Cited in the file of this patent

UNITED STATES PATENTS

| | | |
|---|---|---|
| 2,415,442 | Rackett | Feb. 11, 1947 |
| 2,417,060 | Capstaff | Mar. 11, 1947 |
| 2,670,312 | Capstaff | Feb. 23, 1954 |

FOREIGN PATENTS

| | | |
|---|---|---|
| 574,138 | Great Britain | Dec. 21, 1945 |
| 574,164 | Great Britain | Dec. 21, 1945 |
| 582,438 | Great Britain | Nov. 15, 1946 |